(12) United States Patent
Czechtizky

(10) Patent No.: US 7,025,413 B2
(45) Date of Patent: Apr. 11, 2006

(54) SWING-OUT FLAP PLATE ASSEMBLY FOR A VEHICLE ROOF OPENING

(75) Inventor: Timo Czechtizky, Ebersbach-Rosswaelden (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/963,773

(22) Filed: Oct. 14, 2004

(65) Prior Publication Data

US 2005/0104419 A1    May 19, 2005

(30) Foreign Application Priority Data

Oct. 14, 2003    (DE) ................. 103 47 576

(51) Int. Cl.
*B60J 7/22*    (2006.01)
(52) U.S. Cl. .............................................. 296/217
(58) Field of Classification Search ................ 296/217
See application file for complete search history.

(56) References Cited

U.S. PATENT DOCUMENTS

| 3,922,032 A | 11/1975 | Schaller |
| 5,971,472 A | 10/1999 | Schreiter et al. |
| 6,273,501 B1 | 8/2001 | Raasakka et al. |
| 6,817,659 B1 * | 11/2004 | Vogel et al. ................ 296/217 |

FOREIGN PATENT DOCUMENTS

| DE | 3913567 | * | 10/1990 |
| DE | 196 26 937 | | 1/1998 |
| DE | 202 17 130 | | 3/2003 |
| FR | 2834674 | * | 7/2003 |
| GB | 2 079 697 | | 1/1982 |

* cited by examiner

Primary Examiner—Dennis H. Pedder
(74) Attorney, Agent, or Firm—Crowell & Moring LLP

(57) ABSTRACT

A flap plate is provided on a draft deflector which can be swung out in a forward area of a vehicle roof opening. For operating the flap plate from an inoperative position into an operative position, an adjusting device is provided in the case of which a traction cable controlling the flap plate can be brought into a dead center position in which the drive of the traction cable is relieved.

19 Claims, 4 Drawing Sheets

SWING-OUT FLAP PLATE ASSEMBLY FOR A VEHICLE ROOF OPENING

BACKGROUND AND SUMMARY OF THE INVENTION

This application claims the priority of German Application No. DE 10347576.1-24, filed Oct. 14, 2003, the disclosure of which is expressly incorporated by reference herein.

The invention relates to a swing-out flap plate on a draft deflector which can be swung out in a forward area of a vehicle roof opening. Preferred embodiments of the invention relate to a swing-out flap plate on a draft deflector which can be swung out in a forward area of a vehicle roof opening, the flap plate being swingable by way of an adjusting device from a swung-in basic position arranged below the draft deflector into a swung-up operative position arranged in front of the draft deflector.

From German Patent Document DE 202 17 130 U1, an adjusting device for an additional draft deflector is known which can be operated by way of an adjusting device in such a manner that, by way of cable controls connected with a deflection pulley, the additional draft deflector can be adjusted into a covered inoperative position and into a protruding operative position.

It is an object of the invention to provide a swing-out flap plate for avoiding disturbing vibrations, such as rumbling noises in the vehicle occupant compartment, and to provide an operation of the flap plate which can be swung by way of an adjusting device in a simple manner from an inoperative position into an operative position and vice-versa.

According to certain preferred embodiments of the invention, this object is achieved by providing a swing-out flap plate on a draft deflector which can be swung out in a forward area of a vehicle roof opening, the flap plate being swingable by way of an adjusting device from a swung-in basic position arranged below the draft deflector into a swung-up operative position arranged in front of the draft deflector, wherein the adjusting device comprises a deflection pulley which is operated by a cable and which has a traction cable which is connected with the flap plate and is under spring tension of a restoring spring on the flap plate, and, in an upright operative position of the flap plate, this traction cable is arranged in a dead center position and is supported on a leaf spring element.

An important advantage achieved by means of certain preferred embodiments of the invention relates to the fact that, by way of the adjusting device, the flap plate can be adjusted from the inoperative position into the operative position in such a manner that, in the operative position, a dead center position is reached in which the cable control connected with the flap plate extends through a center of rotation of a deflection pulley of the adjusting device. This relieves the cable control drive. It is provided according to certain preferred embodiments of the invention that the adjusting device comprises a deflection pulley operated by a cable and having a traction cable which is connected with the flap plate and is present under spring tension of a restoring spring on the flap plate. In the upright operative position of the flap plate, the traction cable of the deflection pulley is arranged in a dead center position, and the deflection pulley is supported on a leaf spring element which is prestressed.

In order to reach the dead center position of the traction cable connected with the flap plate, it is also provided according to certain preferred embodiments of the invention that, in the basic position of the flap plate, the traction cable is held at a distance from the axis of rotation at the deflection pulley in a fastening point, and that the traction cable extends through the point of rotation of the deflection pulley in the operative position of the flap plate. According to certain preferred embodiments of the invention, only this position of the fastening of the traction cable on the deflection pulley achieves the dead center position. According to certain preferred embodiments of the invention, so that the deflection pulley cannot be rotated beyond the dead center position, a leaf spring element is provided which is supported on a supporting rib of the receptacle and inhibits the rotating movement of the deflection pulley. The deflection pulley presses against the leaf spring and tensions the latter until the leaf spring rests against the supporting rib, which corresponds to the dead center position. In the operative position of the flap plate, the deflection pulley is supported at the free end of the leaf spring element, and, in this operative position, the leaf spring has an initial tension. Simultaneously, according to certain preferred embodiments of the invention, the leaf spring element advantageously also has the purpose of changing the flap plate from the operative position into the inoperative position in that the pretensioned leaf spring element seeks to move the deflection pulley into rotating movement beyond the dead center.

It is provided according to certain preferred embodiments of the invention, that the adjusting device is arranged in a receptacle which, in a forward-side area, disposes the flap plate in a rotating shaft which carries a pulley for the traction cable and on which the restoring spring is arranged. By means of its one end, the latter is supported at the receptacle and, by means of its other, facing-away end, the spring rests with initial tension against the carrier attachment of the flap plate. As a result of this arrangement in a receptacle, it is advantageously achieved that a compact unit is achieved with the adjusting device and the flap plate, which can be connected in a simple manner with the draft deflector.

An embodiment of the invention is illustrated in the drawings and will be explained in detail in the following.

Other objects, advantages and novel features of the present invention will become apparent from the following detailed description of the invention when considered in conjunction with the accompanying drawings.

DETAILED DESCRIPTION OF THE DRAWINGS

Figure 1:
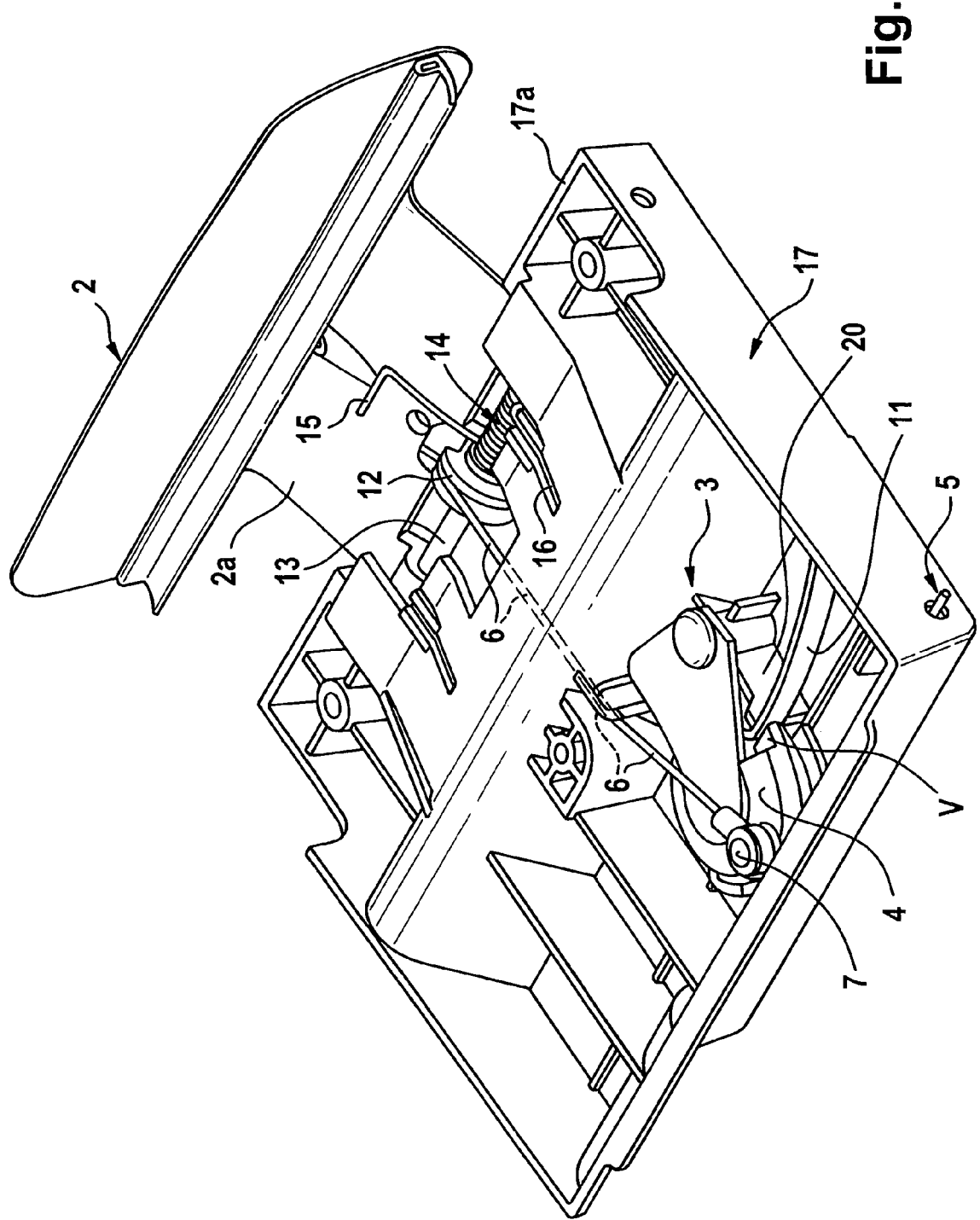
FIG. 1 is a diagrammatic representation of a flap plate with an adjusting device in a receptacle, constructed according to a preferred embodiment of the present invention.

At least one flap plate 2 is arranged on a draft deflector 1 of a sliding roof for a motor vehicle, which flap plate 2 is operated by way of an adjusting device 3 and can be adjusted from a covered inoperative position or basic position I into a projecting operative position II. The adjusting device 3 essentially comprises a deflection pulley 4 which is driven or actuated by a cable control 5. The deflection pulley 4 has a projection V (FIG. 4) by way of which the pulley 4 is supported at the free end of a leaf spring element 11. A traction cable 6 is also connected with the deflection pulley 4 by way of a fastening point 7, which traction cable 6 interacts with flap plate 2.

Figure 3:
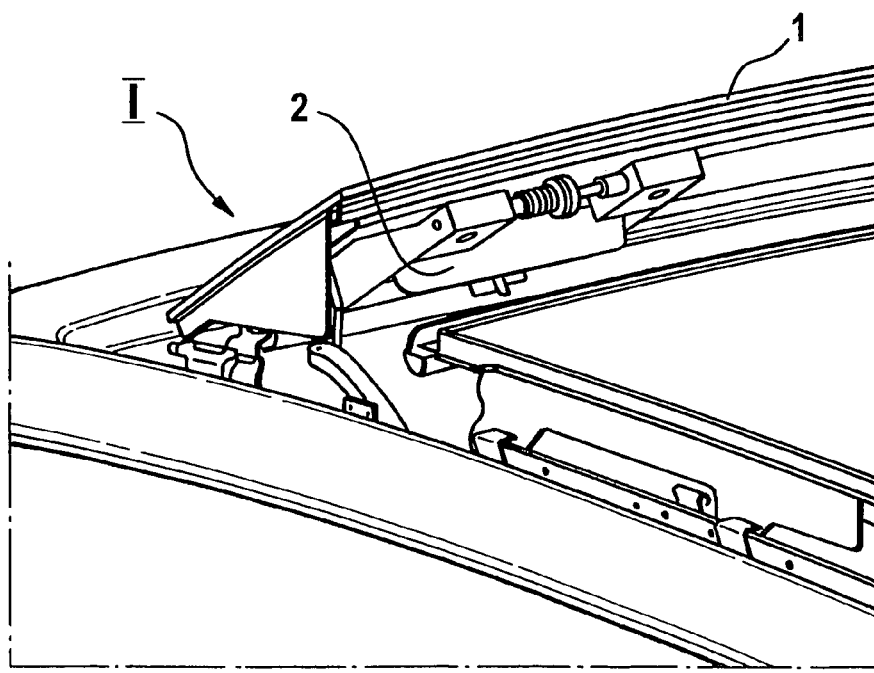
FIG. 3 is a diagrammatic representation of the folded-in flap plate below a draft deflector according to FIG. 2.
Figure 7:
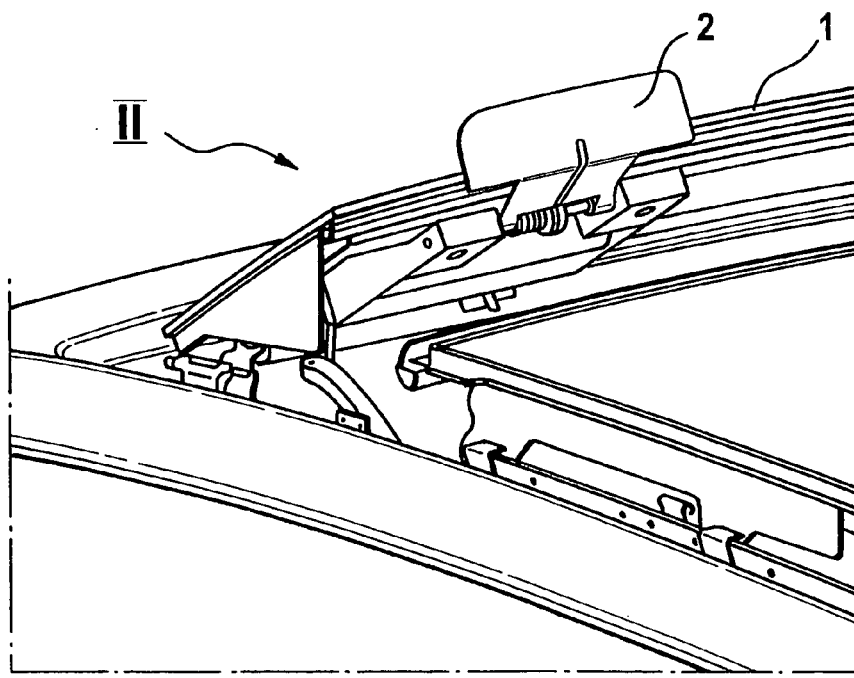
FIG. 7 is a diagrammatic representation of the flap plate in an operative position according to FIG. 6.

The flap plate can be adjusted by way of the cable control 5 from the covered inoperative position I (FIG. 3) arranged below the draft deflector 1, in several steps continuously into the operative position II (FIG. 7), projecting beyond the draft deflector 1.

Figure 2:
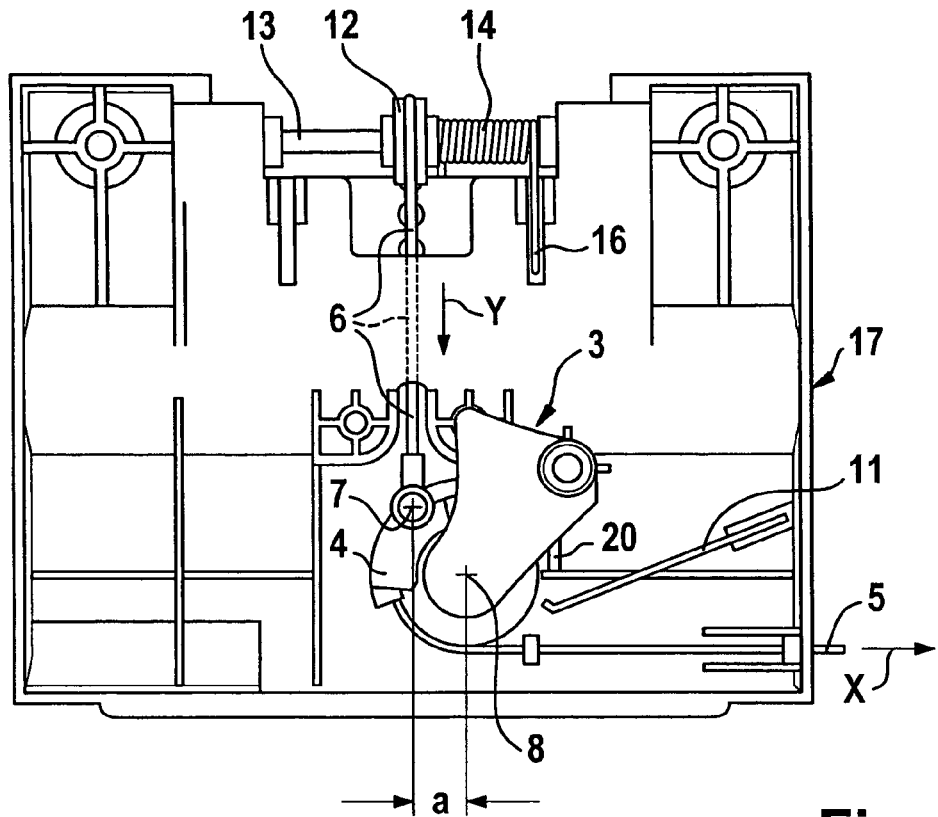
FIG. 2 is a top view of the adjusting device of FIG. 1 showing a folded-in flap plate.
Figure 4:
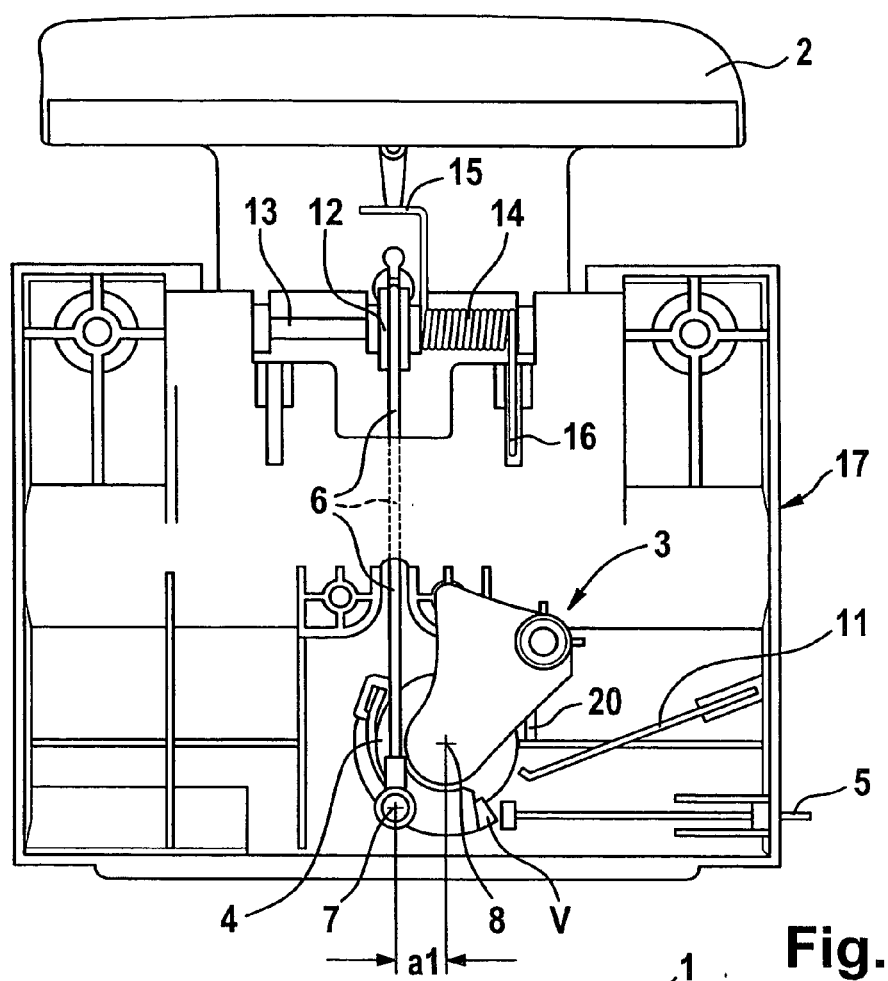
FIG. 4 is a top view of the adjusting device showing the flap plate turning out.

As illustrated in detail in FIGS. 2 and 4, when the flap plate 2 is moved in, the traction cable 6 is held on the deflection pulley 4 at a distance "a" or "a1" with respect to the axis of rotation 8 in the fastening point 7. In addition, as illustrated in detail in FIG. 1, the traction cable 6 is connected with a pulley 12 which on arranged on a rotating shaft 13 of the flap plate 2. A restoring spring 14 is held on this rotating shaft 13, which restoring spring 14 is supported under spring tension by means of one end 15 on the flap plate 2. The facing-away other end 16 of the restoring spring 14 is supported on a receptacle 17 accommodating the adjusting device 3.

Figure 6:
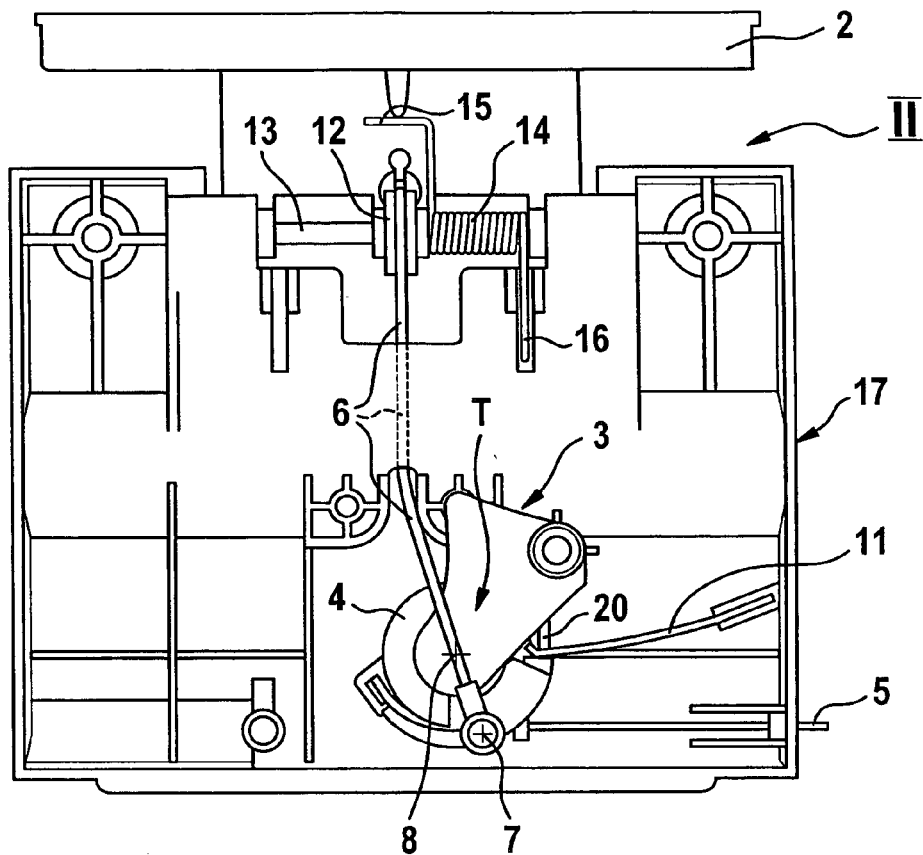
FIG. 6 is a top view of the adjusting device when the flap plate is completely turned out in a dead center position.

The erection of the flap plate takes place by a drive of the cable control 5 in the direction of the arrow X, whereby the traction cable 6 is moved in the direction of the arrow Y, and the fastening point 7 moves the cable 6 into a position through the point of rotation 8 of the deflection pulley 4. The lever arm "a" or "a1" is therefore=0. A so-called dead center position T (FIG. 6) exists. In this position, the flap plate 2 is in the operative position II; that is, it projects beyond the draft deflector 1.

The cable control 5 and therefore the drive are therefore relieved as a result of the position of the cable 6 via the point of rotation 8 of the deflection pulley 4. So that, during the closing of the system, the traction cable 6 can again be pressed out of the dead center position T, the leaf spring element 11 assigned to the deflection pulley 4 is pretensioned in the operative position II of the flap plate 2. Under initial tension, this leaf spring element 11 is supported on a supporting rib 20 of the receptacle 17, which supporting rib 20 is arranged corresponding to the dead center position T.

The adjusting device 3 is arranged in the receptacle 17 in which the flap plate 2 is also adjustably disposed on the rotating shaft 13. For swinging the flap plate 2, a carrier attachment 2a projects through a receptacle wall 17a of the receptacle 17 and can place itself in the inoperative position I below the receptacle 17. The latter can be combined with the draft deflector 1 as a constructional unit in that the open side of the receptacle 17 is oriented toward the draft deflector 1 and is covered.

The operation of the flap plate 2 from the folded-in inoperative position I to the moved-out operative position II is carried out in the following steps.

Figure 5:
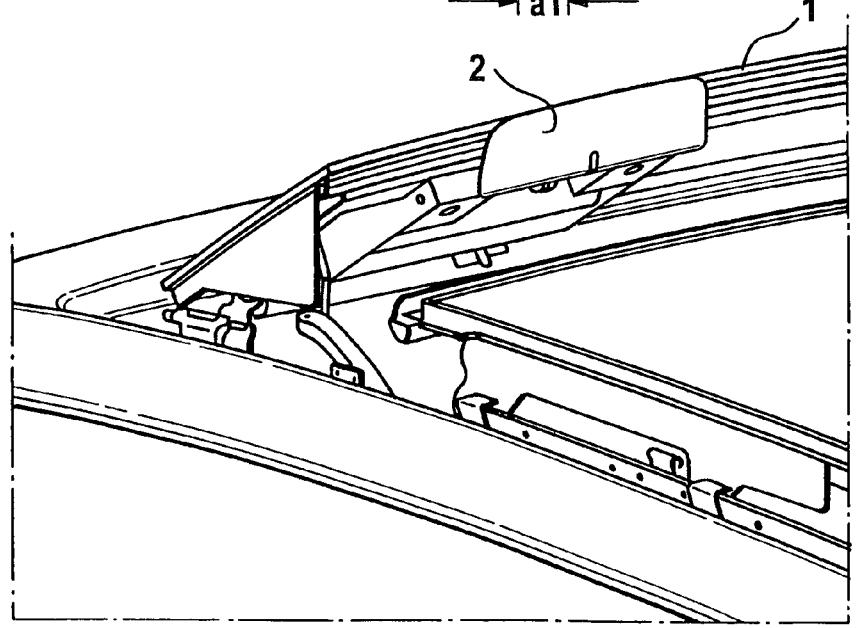
FIG. 5 is a diagrammatic view of the turning-out flap plate in front of the draft deflector according to FIG. 4.

The flap plate 2 is folded in (FIG. 2) and is subsequently turned out by the drive of the cable control 5, in which case the deflection pulley 4 is rotating. As a result, the traction cable 6 is tensioned and the flap plate rotates against the restoring spring 14. The flap plate 2 rotates out farther and is situated directly under the draft deflector 1 (FIGS. 4 and 5), thus is still without a load due to wind pressure. The farther the flap plate is now turned out, the higher the load due to wind pressure. This is counteracted by the lever arm of the traction cable 6 which decreases with an increasing angle of rotation of the deflection pulley 4. This causes no increasing force for the drive of the cable control 5.

The flap plate 2 is now completely rotated out in the operative position II. In this position II, the flap plate 2 is situated in the draft and is thus exposed to the full load due to the wind pressure. In this position II, the traction cable 6 extends through the point of rotation 8 of the deflection pulley 4. Thus, the lever arm of the traction cable 6 is equal to 0, and the drive of the cable control 5 is relieved as a result of this dead center position T. The leaf spring element 11 is required for pressing the traction cable 6 out of the dead center position T during the closing of the system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Swing-out flap plate on a draft deflector which can be swung out in a forward area of a vehicle roof opening, the flap plate being swingable by way of an adjusting device from a swung-in basic position arranged below the draft deflector into a swung-up operative position projecting beyond the draft deflector,
    wherein the adjusting device comprises a deflection pulley which is operated by a cable and which has a traction cable which is connected with the flap plate and is under spring tension of a restoring spring on the flap plate, and, in an upright operative position of the flap plate, this traction cable is arranged in a dead center position and is supported on a leaf spring element.

2. Swing-out flap plate according to claim 1, wherein, in the swing-in basic position of the flap plate, the traction cable is held in a fastening point of the deflection pulley at a distance with respect to the axis of rotation, and wherein, in the swing-up operative position, the traction cable extends through the point of rotation of the deflection pulley.

3. Swing-out flap plate according to claim 1, wherein, in the operative position of the flap plate, the deflection pulley is held to be supported at a free end of the leaf spring element, which leaf spring element has an initial spring tension in the operative position.

4. Swing-out flap plate according to claim 2, wherein, in the operative position of the flap plate, the deflection pulley is held to be supported at a free end of the leaf spring element, which leaf spring element has an initial spring tension in the operative position.

5. Swing-out flap plate according to claim 1, wherein the deflection pulley has a projection by way of which the deflection pulley is supported at a free end of the leaf spring element and, in the dead center position, this leaf spring element rests against a stationary supporting rib in a pretensioned manner.

6. Swing-out flap plate according to claim 2, wherein the deflection pulley has a projection by way of which the deflection pulley is supported at a free end of the leaf spring element and, in the dead center position, this leaf spring element rests against a stationary supporting rib in a pretensioned manner.

7. Swing-out flap plate according to claim 3, wherein the deflection pulley has a projection by way of which the deflection pulley is supported at a free end of the leaf spring element and, in the dead center position, this leaf spring element rests against a stationary supporting rib in a pretensioned manner.

8. Swing-out flap plate according to claim 4, wherein the deflection pulley has a projection by way of which the deflection pulley is supported at a free end of the leaf spring element and, in the dead center position, this leaf spring element rests against a stationary supporting rib in a pretensioned manner.

9. Swing-out flap plate according to claim 1, wherein the adjusting device is arranged in a receptacle, which has a forward-side area,
   wherein the flap plate is disposed on a rotating shaft which carries a traction cable pulley for the traction cable, and
   wherein a restoring spring is arranged on the traction cable pulley which restoring spring is supported by means of one end at the receptacle and, by means of its other end rests under initial spring tension on a carrier projection of the flap plate and seeks to rotate the flap plate toward the basic position.

10. Swing-out flap plate according to claim 2, wherein the adjusting device is arranged in a receptacle, which has a forward-side area,
    wherein the flap plate is disposed on a rotating shaft which carries a traction cable pulley for the traction cable, and
    wherein a restoring spring is arranged on the traction cable pulley which restoring spring is supported by means of one end at the receptacle and, by means of its other end rests under initial spring tension on a carrier projection of the flap plate and seeks to rotate the flap plate toward the basic position.

11. Swing-out flap plate according to claim 3, wherein the adjusting device is arranged in a receptacle, which has a forward-side area,
    wherein the flap plate is disposed on a rotating shaft which carries a traction cable pulley for the traction cable, and
    wherein a restoring spring is arranged on the traction cable pulley which restoring spring is supported by means of one end at the receptacle and, by means of its other end rests under initial spring tension on a carrier projection of the flap plate and seeks to rotate the flap plate toward the basic position.

12. Swing-out flap plate according to claim 4, wherein the adjusting device is arranged in a receptacle, which has a forward-side area,
    wherein the flap plate is disposed on a rotating shaft which carries a traction cable pulley for the traction cable, and
    wherein a restoring spring is arranged on the traction cable pulley which restoring spring is supported by means of one end at the receptacle and, by means of its other end rests under initial spring tension on a carrier projection of the flap plate and seeks to rotate the flap plate toward the basic position.

13. Swing-out flap plate according to claim 5, wherein the adjusting device is arranged in a receptacle, which has a forward-side area,
    wherein the flap plate is disposed on a rotating shaft which carries a traction cable pulley for the traction cable, and
    wherein a restoring spring is arranged on the traction cable pulley which restoring spring is supported by means of one end at the receptacle and, by means of its other end rests under initial spring tension on a carrier projection of the flap plate and seeks to rotate the flap plate toward the basic position.

14. An air deflector assembly for a passenger motor vehicle roof opening, comprising:
    a draft deflector disposed in use at a forward end of the roof opening,
    a flap plate carried by the draft deflector, and
    a flap plate adjusting device operable to move the flap plate between a swung-in basic position disposed below, the draft deflector and a swing-up operative position disposed at least in part above the draft deflector,
    wherein the adjusting device comprises a deflection pulley which is operated by a cable and which has a traction cable which is connected with the flap plate and is under spring tension of a restoring spring on the flap plate, and, in an upright operative position of the flap plate, this traction cable is arranged in a dead center position and is supported on a spring element.

15. An assembly according to claim 14, wherein the spring element is a leaf spring element, and
    wherein, in the basic inoperative position of the flap plate, the traction cable is held in a fastening point of the deflection pulley at a distance with respect to the axis of rotation, and wherein, in the operative position, the traction cable extends through the point of rotation of the deflection pulley.

16. An assembly according to claim 15, wherein in the operative position of the flap plate, the deflection pulley is held to be supported at a free end of the leaf spring element, which leaf spring element has an initial spring tension in the operative position.

17. An assembly according to claim 16, wherein the deflection pulley has a projection by way of which the deflection pulley is supported at a free end of the leaf spring element and, in the dead center position, this leaf spring element rests against a stationary supporting rib in a pretensioned manner.

18. An assembly according to claim 15, wherein the adjusting device is arranged in a receptacle which has a forward-side area,
    wherein the flap plate is disposed on a rotating shaft which carries a traction cable pulley for the traction cable, and
    wherein a restoring spring is arranged on the traction cable pulley which restoring spring is supported by one end at the receptacle and, by way of its other end, rests under initial spring tension on a carrier projection of the flap plate to urge the flap plate to rotate toward the basic position.

19. An assembly according to claim 17, wherein the adjusting device is arranged in a receptacle, which has a forward-side area,
    wherein the flap plate is disposed on a rotating shaft which carries a traction cable pulley for the traction cable, and
    wherein a restoring spring is arranged on the traction cable pulley which restoring spring is supported by means of one end at the receptacle and, by means of its other end rests under initial spring tension on a carrier projection of the flap plate and seeks to rotate the flap plate toward the basic position.

* * * * *